March 24, 1964 R. J. M. J. DE VOGHEL 3,126,208
STEERING ARRANGEMENT FOR A TRUCK
Filed Jan. 23, 1962 2 Sheets-Sheet 1
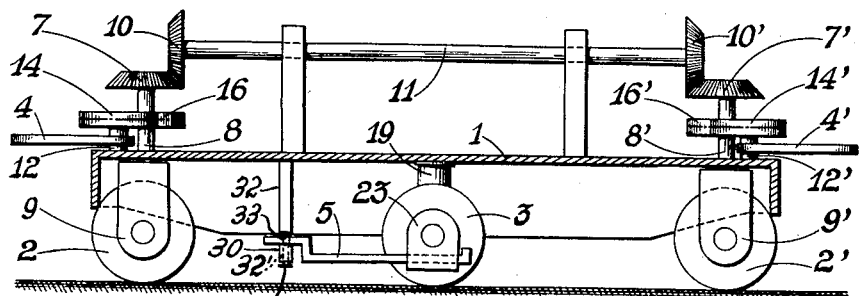
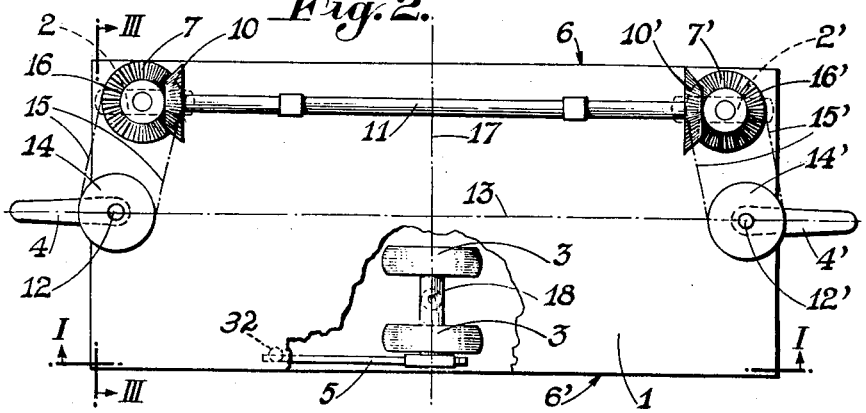
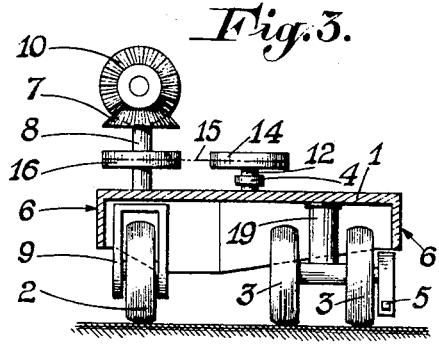 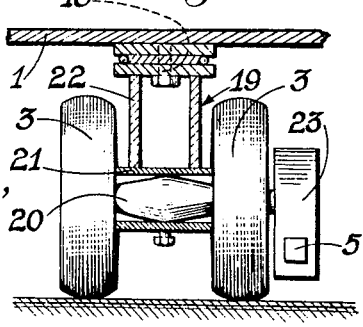
INVENTOR
RAYMOND JEAN MARIE JOSEPH de
VOGHEL
BY Corey, Hart & Stemple
ATTORNEYS March 24, 1964  R. J. M. J. DE VOGHEL  3,126,208
STEERING ARRANGEMENT FOR A TRUCK
Filed Jan. 23, 1962  2 Sheets-Sheet 2
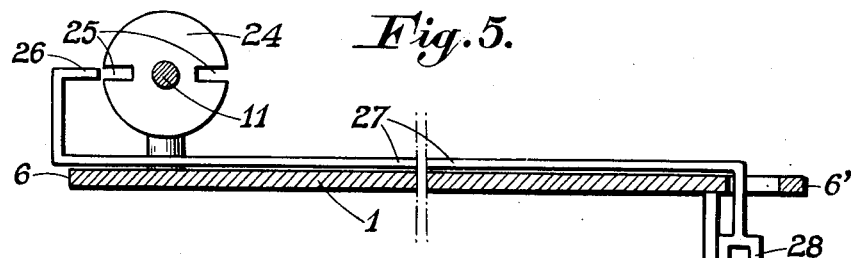
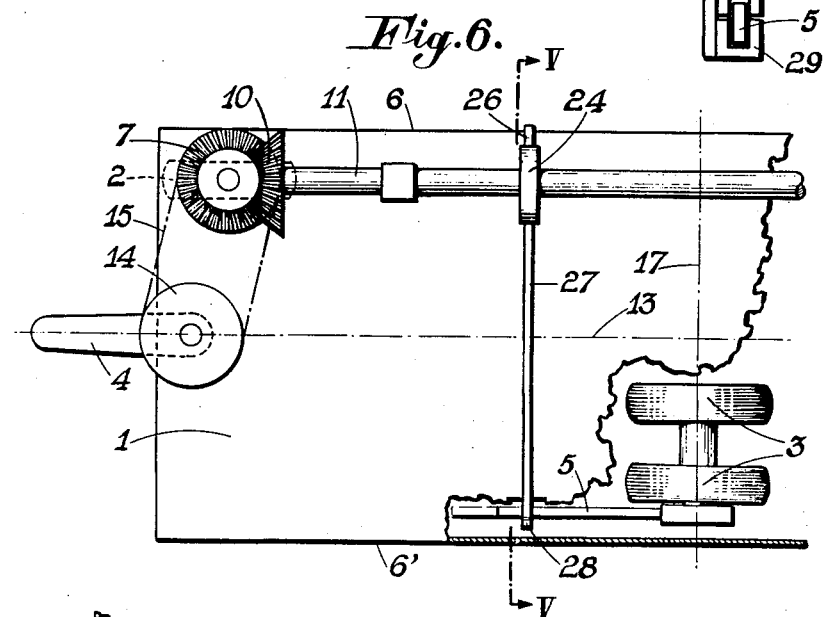
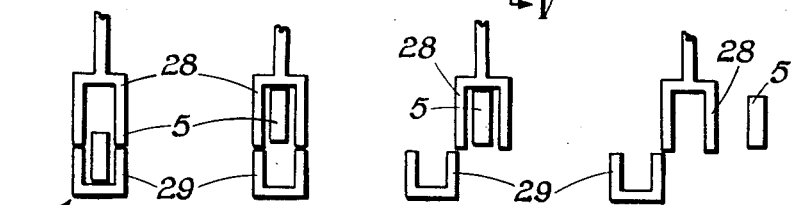
Fig.7.  Fig.8.  Fig.9.  Fig.10.
INVENTOR
RAYMOND JEAN-MARIE JOSEPH de VOGHEL
BY
Corey, Hart & Stemple
ATTORNEYS United States Patent Office 3,126,208
Patented Mar. 24, 1964

3,126,208
STEERING ARRANGEMENT FOR A TRUCK
Raymond Jean Marie Joseph de Voghel, Marcinelle, Belgium, assignor to S.A. Glaverbel, Brussels, Belgium, a company of Belgium
Filed Jan. 23, 1962, Ser. No. 168,144
Claims priority, application Belgium Jan. 25, 1961
15 Claims. (Cl. 280—47.11)

The present invention relates to a wheel set for trucks which are to be displaced in all directions within a small space and are suitable for the transport of heavy loads and of brittle loads within a factory, for instance for displacing and manipulating sheet glass or plate glass stocked in an upright position from a place where such sheets or plates are produced, or cut up to required dimensions, or subjected to finishing treatments, or from a dispatching post to storage places.

At present such trucks are frequently mounted on sets of four or five wheels which are or are not slewable around vertical pivots. As it is difficult or even impossible to correctly adjust the slewing position or direction of all these wheels, and as the wheels, the direction of which is not correctly adjusted, can be damaged at the moment the movement of the truck is started, the manipulations to be effected are difficult to perform and require much space and attention. Slewing round the truck is often impossible and moving it in a direction perpendicular to its normal movement of advance is ruled out. Moreover the multiplicity of the resting points increases the number of shocks to which the truck is subjected during its displacement, this increasing also the risks of breakage of the load if this latter is sheet or plate plass or other fragile material. Moreover, special locking means must be provided for arresting the truck at the places where it is to be loaded and unloaded or for stopping the loaded truck.

The wheel set according to the present invention does away with all the above mentioned disadvantages and difficulties and enables the truck to be displaced easily in any direction within a small space and even of causing it to turn round its vertical axis of symmetry.

To this effect the set of wheels, according to the present invention comprises orientable wheels the orientation of which is effected by means of steering rods acting directly or indirectly upon fittings of the wheels which bear the truck at three points, forming the angles of an isosceles triangle the base of which is situated near one of the longitudinal edges of the truck and is parallel with respect to said edge, while the apex of the triangle opposed to said base is situated near the other longitudinal edge of the truck.

The two fittings of the wheels situated at the angles near the base of the isosceles triangle are connected to each other by mechanical means and each of them is moreover connected to a steering rod capable of imparting to both fittings a pivotal movement of the same angular value in opposite directions, in such a manner that the intersection of the planes of the wheels rotating in said fittings results in a straight line erecting from the transverse axis of symmetry passing through the apex of the isosceles triangle opposite to the base, when the planes of said wheels are inclined with respect to the vertical plane passing through the longitudinal axis of symmetry. There is arranged one steering rod with its pivoting axis within the vertical plane passing through the longitudinal axis of symmetry, near each lateral or end edge of the truck, such steering rod being coupled to the nearest fitting by mechanical means enabling to hold the plane of the wheel which rotates within said fitting, in parallelism with the steering rod.

According to a preferred form of execution of the invention, the fittings of the wheels situated at the angles near the base of the isosceles triangle are connected or coupled to each other by means of a shaft provided on each end with a bevel gear pinion meshing with a corresponding pinion or plate mounted on the pivot axis of each fitting, these fittings being moreover connected to the nearest steering rod by means of an endless chain passing around sprocket wheels fixed to the pivoting axes of the fitting and of the steering rod. Both fittings are preferably constituted by forks provided each with a wheel and with a pivoting axis mounted in the plate of the truck.

At the apex of the isosceles triangle opposite to the base of the latter, there is a third fitting provided with a wheel and a pivoting axis and actuated directly by means of a steering rod which is preferably arranged at right angles to the axis of the wheel, so as to remain hidden beneath the plate of the truck when the axis of the wheel is parallel with the transverse axis of symmetry of the truck, for the purpose of displacing the truck either longitudinally in a straight line or along a curve. When the steering rod is drawn forth from beneath the plate of the truck and brought into parallelism with the transverse axis of symmetry of the truck, thereby placing the axis of the wheel of the third fitting in a direction perpendicular to said transverse axis of symmetry, it is possible either to stop and arrest the truck if the axes of the wheels of the two other fittings, which are coupled to each other and controlled by the respective co-operating steering rods, are substantially parallel to the transverse axis of symmetry, or to laterally displace the truck if the axes of the wheels of said two coupled fittings are perpendicular to the transverse axis of symmetry of the truck.

The third fitting comprises advantageously a horizontal sleeve fixed to a vertical bushing capable of rotating round a pivot which is fixed to the plate of the truck, and, housed within said sleeve is a short axle with outwardly extending journals, on which is mounted a freely rotating pair of wheels. Said axle is preferably fixed and of slightly biconical shape, for compensating in the sleeve the unevenness of the ground upon which said wheels pass.

The trucks mounted on wheel sets according to the present invention, as described above, can be easily moved in longitudinal and transverse directions, along straight lines or curves of any radius, which can be very small, and can be swung or slewed round the centre of intersection of their axes of symmetry. The steering rods, at least one of which is always available to receive the required pull or push, show the direction of movement for which the wheels have been set, and for blocking the truck it will be sufficient to bring the steering rod of the third wheel fitting into a position which is approximately perpendicular to that of the other steering rods. The reduced number of wheels contributes to the diminution of the number of shocks imparted to the truck during its displacements.

According to the present invention the truck device described above may also be provided with a locking mechanism for locking either the co-operating steering rods, or the third steering rod controlling the wheel fitting situated at the apex opposite to the base of the isosceles triangle.

Such locking mechanism comprises advantageously: a plate provided with radial notches and fixed on the shaft which couples to each other the two co-operating wheel fittings described above; a finger capable of being introduced into one of the notches of the plate, said finger being mounted on one end of a rod arranged parallel to the transverse axis of symmetry, such rod being provided on its other end with a vertically extending fork which opens downwards and is capable of being brought into register with another fork fixed to the plate or frame of the truck and opening upwards. The operation of this mechanism consists in that, on the one hand, said forks retain the third steering rod when the notched plate is in a position in which said finger cannot penetrate into either of said notches thereby leaving said co-operating steering rods free for orientation, and in that, on the other hand, said forks set free said third steering rod when the finger can enter into one of the notches, thereby locking the co-operating steering rods in a position parallel to the transverse axis of symmetry.

The attached drawings show by way of example and diagrammatically one form of execution of the invention.

FIG. 1 is a sectional side view along line I—I of FIG. 2 of a truck constructed according to the present invention;

FIG. 2 is a plan view thereof;

FIG. 3 is a section along line III—III of FIG. 2 through a truck in front view;

FIG. 4 shows at an enlarged scale the third wheel fitting;

FIG. 5 is a sectional view of another embodiment of the invention, the view being taken along line V—V of FIG. 6;

FIG. 6 is a plan view of approximately one half of such other embodiment and shows the locking mechanism for the steering rods, and FIGS. 7 to 10 show the unlocking steps of the third steering rod in such other embodiment by way of lateral displacement of the opposite locking forks.

The wheel set which supports the plate or load platform 1 of the truck at three points comprises three wheel units having orientable wheels 2, 2' and 3, the orientation of which is controlled by the three steering members or rods 4, 4' and 5, the wheel units of wheels 2, 2' being connected to rotate in unison when either of the steering rods 4, 4' are actuated, and the wheel unit of wheel 3 being rotatable independently of the other two units when the third steering rod 5 is operated. The wheels 2 and 2' are situated near the ends of the longitudinal edge 6 of plate 1 and are connected to each other by a positive transmission which comprises bevel gear pinions 7, 7', fixed on the pivoting axes 8, 8', of the fittings 9, 9' of the wheels and mesh with pinions 10 and 10' fixed to the ends of a shaft 11 in such a manner that the pivoting movement of the fitting 9 or 9' through a certain angle will produce the pivoting movement in the opposite sense and through the same angle of the other fitting. The pivoting axis 12, 12' of the steering rods 4, 4' are situated within the longitudinal axis of symmetry 13 (FIG. 2) and bear sprocket wheels 14, 14' connected through chains 15, 15' to sprocket wheels 16, 16' fixed on the pivoting axes 8, 8' of the fittings 9, 9' of the conjugate wheels 2, 2'. Thus orientation of the wheels 2 and 2' may be effected also by means of the one or the other co-operating steering rods 4, 4', this being an advantage when the truck must be moved through narrow passages or when one of the steering rods is practically inaccessible for imparting to it the necessary pulling or pushing force. Whenever the planes of the wheels 2 and 2' are not parallel to the axis of symmetry 13 or to the transverse axis of symmetry 17 the intersection of these planes generates a straight line erected on the axis of symmetry 17 (FIG. 2).

The pivoting axes 8 and 8' of the wheel fittings 9 and 9' are at the angles near the base of an isosceles triangle the opposite apex of which is situated on the transverse axis of symmetry 17 near the longitudinal edge 6' of plane 1, this apex being the place at which is situated the pivoting axis 18 of the third wheel fitting 19 the orientation of which is effected directly by means of steering rod 5. Though the fitting 19 may be arranged for receiving a wheel 3 similar to wheels 2 and 2' but wider than the latter so as to take into account the higher load it has to support, the illustrated example shows that the load is disributed on a pair of wheels 3 loosely mounted on the outwardly extending journals of an axle 20 of slightly biconical form housed within a sleeve 21 fixed to a vertical bushing 22 capable of rotating round a pivot 18 fixed beneath the plate 1 of the truck. The clearance between the sleeve 21 and the biconical axle 20 affords the possibility of equilibrating the load resting on wheels 3 in spite of the unevenness of the ground. The steering rod 5 is fixed upon an extension 23 of one of the journals of the axle 20, perpendicular to the latter. Thus the steering rod 5 is hidden under the plate 1 and may be locked to the latter by tightening means composed of a sleeve 30 provided on the lower reduced end 32' of a bar 32 depending from such plate 1, and a screw 31 connecting such sleeve to the bar, when the axle 20 is parallel to the axis of symmetry 17. In the locked condition of steering rod 5, the inner edge portion of the outer end thereof will abut against the reduced bar end 32', and will be clamped between the shoulder 33 formed on the bar 32 at the top of the reduced end 32' thereof, and the upper end of the sleeve 30. With the steering rod 5 thus locked the truck is in the proper state for being disposed in the longitudinal direction. In this case, locking or arresting of the truck is effected by moving the steering rod 5 outwardly from under the plate or platform 1 and beyond the adjacent longitudinal edge of the latter so as to cause the third fitting 19 to pivot through 90° thereby bringing the axle 20 into parallelism with the axis of symmetry 13. In this position of the axle 20 the truck may be moved laterally, i.e. in the direction of the symmetry axis 17 if the co-operating steering rods 4 and 4' are brought into parallelism with this latter axis of symmetry, for instance for parking the truck.

To prevent deterioration and accidents which may result from inadvertently applying a pull to a truck the wheels of which are badly orientated which would cause the truck to advance by jerks if the pull is of sufficient magnitude, there may be provided a locking mechanism for the steering rods such locking mechanism arresting either the third steering rod when all the wheels are orientated for advancing the trucks in the direction of one of the co-operating or conjugate steering rods or, for arresting these latter in a position parallel to the transverse axis of symmetry 17 if the third steering rod is also parallel to said axis and the truck is ready for being displaced laterally.

Such locking mechanism for the steering rods may be constituted by a plate 24 fixed to shaft 11 and provided with notches 25 into one of which can be introduced a finger 26 extending in the form of a crank from a bar 27 which extends across the plate 1 of the truck parallel to the transverse axis of symmetry 17, and which is provided at its end near the edge 6' of the plate 1 with a vertical fork 28 opening downwards and situated above a fork 29 opening upwards and fixed to the plate or frame of the truck. The steering rod 5 is locked within the forks 28 and 29 (FIG. 7) when the conjugate steering rods 4, 4' are freely orientated. When these latter are parallel to the transverse axis of symmetry 17 and are directed either towards edge 6 or towards edge 6', the one or the other notch 25 is in front of finger 26. This latter penetrates automatically into the respective notch when the steering rod 5 is lifted from the position shown in FIG. 7 into fork 28 (FIG. 8) and is then displaced with this latter laterally relative to fork 29 as shown in FIG. 9; the steering rod 5 being then disengageable from fork 28 (FIG. 10) by a descending movement to enable it to be further displaced to turn the wheels 3.

When finger 26 enters into one of the notches 25 the shaft 11 is locked and the conjugate steering rods are arrested in the position in which the truck may be displaced laterally after having brought the steering rod 5, which then occupies its free position, into the direction corresponding to said direction of displacement of the truck.

Naturally, the invention is not limited to the embodiments described and illustrated by way of example, and modifications may be made thereto without departing from its scope.

Thus the mechanism for orientating the wheels as described above may be replaced by any other mechanism resulting in the same effect and placed for instance entirely or partially beneath the plate or frame of the truck for leaving the whole top surface of said plate or frame free for the load.

I claim:

1. A truck adapted to be moved in all directions in a small area comprising a platform for supporting a load and having longitudinal side edges and end edges, a wheel set composed of three wheel units each comprising a wheel and a swivel fitting for such wheel connected to said platform for free rotatable movement of such unit about a vertical axis, said units being arranged relative to said platform so that such axes thereof define the points of an isosceles triangle, two of said wheel units being situated in spaced relation longitudinally of said platform near one of the longitudinal side edges thereof and defining the base of such triangle, and the third wheel unit being situated near the other longitudinal side edge of said platform so that it is at the apex of such triangle, steering means for said two longitudinally spaced wheel units including longitudinal means connected to the fittings of said two units and coupling said two units together for simultaneous, similar rotational movements about their vertical axes, and a hand steering member connected to the fitting of each of said two units so that when either of said steering members is operated both of said units are simultaneously rotated, and a third steering member connected to the fitting of said third wheel unit and operable to rotate such third wheel unit independently of said other two units.

2. A truck such as defined in claim 1, in which said steering means includes a rotatable member associated in spaced relation with the fitting of each of said two units and mounted on an end portion of said platform midway between the base and apex of said triangle, and means connecting said rotatable member to said associated fitting so that rotational movement of one will cause rotational movement of the other, the hand steering member connected to said associated fitting being mounted on said rotatable member and operable through the latter and said connecting means to rotate said associated fitting.

3. A truck such as defined in claim 2, in which said means connecting each of said rotatable members to its associated fitting comprises a sprocket mounted on said rotatable member, a sprocket mounted on said associated fitting, and an endless chain carried by said sprockets.

4. A truck such as defined in claim 1, in which said longitudinal steering means comprises a longitudinal shaft extending between said two longitudinally spaced wheel units, and gearing connecting the ends of said longitudinal shaft to the fittings of said two units.

5. A truck such as defined in claim 4, including means for locking said steering means for said spaced wheel units in a given position of the wheels of such units, said locking means comprising a plate provided with a radial notch secured to said longitudinal shaft, a finger movable into engagement with the notch in said plate, and means movably supporting said finger on said platform.

6. A truck such as defined in claim 5, in which said means movably supporting said finger comprises a rod extending transversely of said platform and having said finger provided at one end thereof, a first vertically extending fork provided at the other end of said rod so that the opening thereof extends downwardly, and a second vertically disposed fixed fork having an upwardly extending opening with which the opening of said first fork registers, said third steering member of said third wheel unit being receivable in the openings of said forks and said forks cooperating to lock said steering member in a given position of the wheel of such third wheel unit when said finger is disengaged from said notched plate, said third steering member being released from the cooperative locking action of said forks when said finger is engaged with said notched plate.

7. A truck such as defined in claim 1, in which each of said unit fittings is constituted of a work provided with a vertical axis rotatably connected to said platform.

8. A truck such as defined in claim 1, in which said third steering member for said third wheel unit is connected to said fitting thereof at a place below said platform.

9. A truck such as defined in claim 8, in which said third wheel unit hand steering member is constituted of a steering rod disposed transversely to the axis of rotation of such unit and to the axis of rotation of the wheel mounted in said fitting thereof so that said rod is hidden beneath said platform when said wheel axis is at right angles to the base of said triangle, said steering rod being movable out beyond said other longitudinal side edge of said platform to dispose said wheel axis in parallelism with such triangle base to block movement of the truck in a longitudinal direction and facilitate movement of the same in a transverse direction.

10. A truck such as defined in claim 1, in which said fitting of the third wheel unit comprises a vertical member rotatably connected to said platform, a horizontal tubular member fixed intermediate its ends to the lower end of said vertical member, and a short axle housed within said tubular member and having outwardly extending journals projecting beyond the ends of said tubular member, and a pair of wheels rotatably mounted on said journals.

11. A truck such as defined in claim 10, in which the portion of said axle contained within said tubular member has an exterior configuration different than the interior configuration of said tubular member and is such as to enable compensation in the tubular member for unevenness of the ground over which the wheels pass.

12. A truck such as defined in claim 1, including means for locking said steering means for said spaced wheel units against movement when the wheels of such units are in a given position.

13. A truck such as defined in claim 1, including means for locking said third steering member against movement when the wheel of said third wheel unit is in a given position.

14. A truck such as defined in claim 13, in which said locking means comprises means for locking said steering means for said spaced wheel units in given positions of the wheels of said spaced wheel units.

15. A truck such as defined in claim 13, in which said locking means comprises a movable member engageable in locking engagement with said third steering member of said third wheel unit, and means for movably supporting said member on said platform.

References Cited in the file of this patent

UNITED STATES PATENTS

| 1,621,856 | Sedgwick | Mar. 22, 1927 |
| 1,716,732 | Mossay | June 11, 1929 |
| 2,950,121 | Fisher | Aug. 23, 1960 |

FOREIGN PATENTS

| 1,073,832 | France | Mar. 24, 1954 |

UNITED STATES PATENT OFFICE
CERTIFICATE OF CORRECTION

Patent No. 3,126,208              March 24, 1964

Raymond Jean Marie Joseph de Voghel

It is hereby certified that error appears in the above numbered patent requiring correction and that the said Letters Patent should read as corrected below.

Column 1, line 33, for "plass" read -- glass --; column 6, line 11, for "work" read -- fork --.

Signed and sealed this 5th day of January 1965.

(SEAL)
Attest:

ERNEST W. SWIDER
Attesting Officer

EDWARD J. BRENNER
Commissioner of Patents